US005381381A

United States Patent [19]

Sartori et al.

[11] Patent Number: 5,381,381

[45] Date of Patent: Jan. 10, 1995

[54] FAR FIELD ACOUSTIC RADIATION REDUCTION

[75] Inventors: Michael A. Sartori, McLean; Joseph A. Clark, Arlington, both of Va.

[73] Assignee: The United States of America as represented by the Secretary of the Navy, Washington, D.C.

[21] Appl. No.: 128,411

[22] Filed: Sep. 30, 1993

[51] Int. Cl.[6] ............ H04B 15/00

[52] U.S. Cl. ............ 367/1; 367/901

[58] Field of Search ............ 367/1, 901, 124, 13

[56] References Cited

U.S. PATENT DOCUMENTS 3,740,707 6/1973 O'Brien et al. ............ 367/1
4,025,724 5/1977 Davidson, Jr. et al. ............ 367/1
5,247,486 9/1993 Regnault ............ 367/23

*Primary Examiner*—Ian J. Lobo
*Attorney, Agent, or Firm*—Charles D. Miller

[57] ABSTRACT

A system and method are provided to reduce a structure's far field acoustic radiation signature. A plurality of acoustic sensors are positioned in the acoustic near field of the structure for measuring the near field acoustic radiation of the structure. A programmable controller generates a prediction of the structure's far field acoustic radiation signature using the near field acoustic radiation. The prediction is then used to generate a noise control signal applied to a plurality of acoustic radiators suspended within the structure. The radiators convert substantially all of the noise control signal to airborne acoustic energy within the structure.

12 Claims, 1 Drawing Sheet

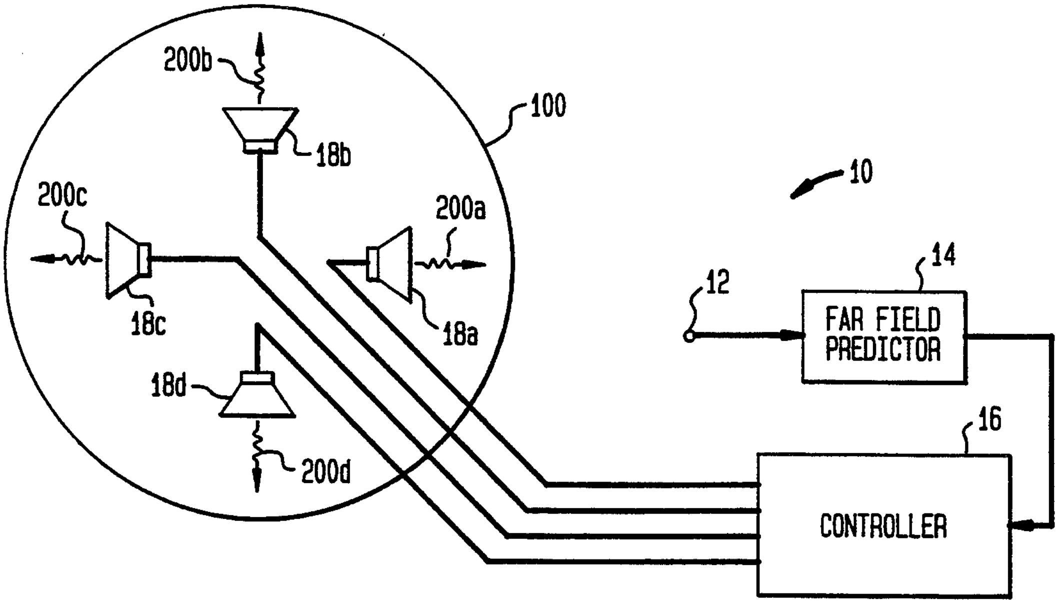
200b
100
18b
10
200c
200a
14
12
18c
18a
FAR FIELD
PREDICTOR
18d
16
200d
CONTROLLER

FAR FIELD ACOUSTIC RADIATION REDUCTION

The invention described herein may be manufactured and used by or for the Government of the United States of America for governmental purposes without payment of any royalties thereon or therefor.

FIELD OF THE INVENTION

The invention relates generally to active noise control, and more particularly to a method and system for reducing a structure's far field acoustic radiation signature.

BACKGROUND OF THE INVENTION

A structure of unspecified size and shape, either stationary or moving, has some type of internal excitation. This internal excitation energy is passed through the structure until it reaches the shell of the structure. The energy on the shell then dissipates into the surrounding field and can be regarded as emanating acoustic waves. The acoustic waves on the surface of the structure are either radiating waves or non-radiating (i.e., evanescent) waves and exist in a region known as the evanescent acoustic near field. The radiating acoustic waves cause observable responses in the acoustic far field. For many underwater structures, it is desirable to reduce the observable acoustic radiation responses in the acoustic far field of a radiating structure.

In attempting to reduce the far field acoustic radiation from a structure using an active control system, a measurement of the amount of acoustic radiation in the acoustic far field is desirable as a means of ascertaining the performance of the active control system. In a typical application, this is not measured and is often times unmeasurable. For instance, if the structure is a moving vehicle, it is difficult and impractical to place acoustic measurement devices in the acoustic far field to measure the acoustic radiation from the vehicle.

Current active control methods circumvent this problem of actually measuring the far field radiation by focusing on vibrations within the structure. The active control system essentially attempts to minimize the vibrations of the structure, and the system's performance criterion is based on measurements of the structure's vibrations. However, by attempting to reduce the vibrations of a structure, the main objective of reducing the far field acoustic radiation levels can be achieved with certainty only if all the vibrations of the structure are reduced.

More specifically, in structural acoustic active control, the active control system reduces the outputs of the structure's modes, which are analyzed from a structural acoustics point of view. Modes are a means of classifying the frequency dependent vibrations of a structure. When a structure is excited, the modes of the structure are said to be excited and some of these modes cause acoustic radiation to the far field while some do not. With structural acoustic active control, energy to control the structure's vibrations is placed directly into the structure with the purpose of reducing the modal contributions to the acoustic radiation in the far field. Thus, intimate knowledge of the structure's modes is required to apply structural acoustic active control. However, as the complexity of the structure increases, this knowledge is more difficult and expensive to obtain.

SUMMARY OF THE INVENTION

Accordingly, it is an object of the present invention to provide a system and method to reduce a structure's far field acoustic radiation signature.

Another object of the present invention is to provide a system and method that reduces the far field acoustic radiation signature of a structure that is simpler to implement than structural acoustic active control systems.

Other objects and advantages of the present invention will become more obvious hereinafter in the specification and drawings.

In accordance with the present invention, a system is provided to reduce a structure's far field acoustic radiation signature. A plurality of acoustic sensors are positioned in the acoustic near field of the structure for measuring the near field acoustic radiation of the structure. A programmable controller connected to the sensors generates a prediction of the structure's far field acoustic radiation signature using the near field acoustic radiation. The same or different programmable controller then generates noise control signal(s) using the prediction. A plurality of acoustic radiators are suspended within the structure convert substantially all of the noise control signal(s) to airborne acoustic energy within the structure. In this way, the far field acoustic radiation is reduced without having to solve the complex problem of controlling a structure's vibration characteristics.

BRIEF DESCRIPTION OF THE DRAWINGS

The sole figure is a schematic view of the far field acoustic radiation reduction system according to the present invention.

DETAILED DESCRIPTION OF THE INVENTION

Referring now to the sole figure, a schematic view is shown of a structure 100 equipped with a system 10 for reducing the far field acoustic radiation signature in accordance with the present invention. While not shown, it is to be understood that structure 100 typically includes a variety of equipment that excites the shell of structure 100 into vibration. It is this structural vibration that is the source of both near and far field acoustic radiation signatures of structure 100.

System 10 includes an acoustic sensing system, represented for purposes of illustration by sensor 12, for measuring near field acoustic radiation of structure 100. It is to be understood that sensor 12 is representative of any one of a variety of well known stationary acoustic near field sensing systems. Typically, sensor 12 is representative of a plurality of sensors (e.g., hydrophones when structure 100 is submerged in a liquid) located at specific points in the acoustic near field of structure 100. For example, sensor 12 could represent line array(s), array(s) that conform to the shape of the structure, multiple tiers of sensors or arrays of sensors, sensors placed sparsely or densely in the entirety of the acoustic near field of the structure, etc.

Regardless of the number of sensors and system of locating same around structure 100, the output of sensor 12, i.e., the acoustic near field radiation produced by structure 100 as measured by sensor 12, is fed to a far field predictor 14. Far field predictor 14 is typically a programmable microprocessor that processes the acoustic near field measurements to obtain a prediction of the structure's far field acoustic radiation signature.

Programming of far field predictor 14 may be based on a variety of prediction techniques. For example, two well known acoustic far field prediction techniques include: 1) propagation via the exterior Helmholtz integral as disclosed by Clark et al. in "Numerical Propagation of Spatially Distributed Acoustic Sources Using the Exterior Helmholtz Integral Equation", Statistical Signal and Array Processing Workshop, Victoria, British Colombia, Canada, Oct. 7–9, 1992, or 2) wave vector filtering disclosed by Clark et al. in "Acoustical Holography Measurements on Circular-Ribbed and Helical-Ribbed Steel Cylindrical Models", Research and Development Report, Signatures Directorate, Carderock Division, Naval Surface Warfare Center, September 1993.

In the Helmholtz integral approach, a discrete approximation of a closed measurement surface is used. For example, if the structure were cylindrical, discrete surface points are selected along the length of the cylinder and radially around the cylinder's endcaps. The exterior Helmholtz integral is then solved for each of the discrete surface points as a prediction of the far field acoustic radiation signature. By way of example, a MATLAB code implementation of this approach for a cylindrical structure is attached hereto as an Appendix.

In the wave vector filtering approach, measured data of the structure's acoustic near field is transformed from the position-time domain into the wave vector-frequency domain using the well known Fast Fourier Transform. For each frequency bin, the values of the wave vector bins around a small angle about the zero wave vector bin are summed to produce an estimate of the acoustic far field.

In either case, the prediction of the far field acoustic radiation signature generated by far field predictor 14 is output to a controller 16 where the predicted far field acoustic radiation signature is used as a control parameter to reduce the actual far field acoustic radiation signature. Controller 16 may be a microprocessor (e.g., the same microprocessor used for far field predictor 14 or a separate microprocessor) programmed with any well known acoustic noise control algorithms. For example, in its simplest implementation, controller 16 could be a phase shifter that processes the predicted far field acoustic radiation signature to output a phase shifted version of same (e.g., 180° out-of-phase with the predicted far field acoustic radiation signature). Other well known but more complex acoustic noise control algorithms may also be employed and include, but are not limited to, classic control, modern control and adaptive control.

The output of controller 16 is one or more time varying noise control signal(s) fed to one or more acoustic radiators (e.g., loudspeakers). For purpose of illustration, four radiators 18*a,* 18*b,* 18*c,* and 18*d* are shown. However, it is to be understood that more or less radiators may be used depending on the structure's size, shape and vibration radiation characteristics. The actual number of acoustic radiators and their placement within structure 100 may be determined by well known acoustic calibration techniques.

Each acoustic radiator receives its signal and converts same to airborne acoustic energy represented by arrows 200*a*–200*d.* The airborne acoustic energy is converted to structural excitation at the shell of structure 100. The airborne acoustic energy serves to reduce the predicted acoustic far field radiation signature without attempting to cancel the vibration of structure 100 due to internal equipment operation. Accordingly, each acoustic radiator 18*a,* 18*b,* 18*c,* and 18*d* must be mounted within structure 100 to insure that substantially all of the noise control signal is converted to airborne acoustic energy. Such vibration isolation mounting may be employed according to any one of a variety of techniques well known in the art.

The advantages of the present invention are numerous. When structure-borne actuators are used to reduce the structure's vibrations, the actuators must transmit their energy directly into the structure via single attachment points. The problem of determining the location of the attachment point(s) is a difficult and time-consuming task since knowledge of the structure's modes of vibration are required. Rather than attempting to solve the complex problem of controlling a structure's vibrations, the present invention allows the structure to vibrate and simply reduces the observable acoustic radiation in the far field in a novel fashion. By using airborne acoustic energy originating from within the structure, the energy used to reduce or negate the acoustic far field effects of the structure's vibrations may be transmitted to a larger portion of the structure as opposed to a single point. Thus, when the control energy is applied to the airborne path instead of the structure-borne path, the need to input sufficient energy into the structure to overcome internal structural damping is not required. Further, the complex problems of determining where to locate the structural excitation devices is no longer as difficult to solve. Finally, the present invention makes use of a prediction of the far field acoustic radiation signature developed from the easily measured near field in a far field acoustic radiation reduction system.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

APPENDIX

```
function [pfp]=helmholtz_3s(fx,fy,fz,sx,sy,sz,ex,ey,ez,
pc1,pc2,pc3,pc4,pc5,pc6, pc7,pc8,pc9,dr,de,a1,a2,q)
%   Computes far field pressure using helmholtz integral
%   Uses tri-surface cylindrical conformal array
%
%   Inputs:
%   fx,fy,fz: far field points for pressure to be computed
%   sx,sy,sz: surface points for cylinder length
%   ex,ey,ez: endcap points for cylinder ends
%   pc1,pc2: pressure over cylinder length
%   pc3,pc4: pressure over cylinder end caps
%   dr: delta_r (if pc1-pc2, then dr=radius1-radius2)
%   de: delta_e (if pc3-pc4, then de=(neg. number))
```

-continued

APPENDIX

```
%   a1: elarea1
%   a2: elarea2
%   q: desire endcaps in calculation? 1=y 2=n
%
%   Outputs:
%   pfp: far field pressure
%
%   function [pfp]=helmholt_3s(fx,fy,fz,sx,sy,sz,ex,ey,ez,pc1,pc2,
%                              pc3,pc4,pc5,pc6,pc7,pc8,pc9,dr,de,al,a2,q);
%
%   Michael A. Sartori, Ph.D., June 7, 1993
%   UPDATES:
%
%   helmholtz contribution from cylinder length

sxx=reshape(sx,1,ncp*nlp);
syy=reshape(sy,1,ncp*nlp);
szz=reshape(sz,1,ncp*nlp);
pts=reshape(pc1,1,ncp*nlp);
ptd=reshape(-3*pc1+4*pc2-pc7,1,ncp*n1p)/(dr*2);      % tri-surface
cnt=0;
ffmax=max(size(fx));
disp([‘    field point calculations: ’,num2str(ffmax)])
for ff=1:ffmax
    cnt=cnt+1;if cnt==40;disp(]‘     field point number ’,num2str(ff)]),cnt=0;end
    fxx=fx(ff)*ones(1,ncp*nlp);
    fyy=fy(ff)*ones(1,ncp*nlp);
    fzz=fz(ff)*ones(1,ncp*nlp);
    rsf=radial_dist(fxx,fyy,fzz,sxx,syy,szz);      %size: 1x(ncp*nlp)
    csb=((fxx-sxx).*sxx+(fyy-syy).*syy)./(rsf.*(sqrt(sxx.  2 + syy.  2)));
    mon=-exp(j*kay*rsf).*a1./(4*pi*rsf);
    pfp(ff)=sum(mon.*(-csb.*(-1../rsf+j*kay).*pts + ptd));
end

% helmholtz contribution from end caps
if q==1
    disp(‘    end cap calculations ’);
    exx=reshape(ex,1,ncp*nrp);
    eyy=reshape(ey,1,ncp*nrp);
    ezz=reshape(ez,1,ncp*nrp);
    pts_posz=reshape(pc3,1,ncp*nrp);
    ptd_posz=reshape(-3*pc3+4*pc4-pc8,1,ncp*nrp)/(2*de);      % tri-surface
    pts_negz=reshape(pc5,1,ncp*nrp);
    ptd_negz=reshape(-3*pc5+4*pc6-pc9,1,ncp*nrp)/(2*de);      % tri-surface
    cnt=0;
    for ff=1:ffmax
        cnt=cnt+1;
        if cnt==40;disp([‘    field point number ’,num2str(ff)]),cnt=0;end
        fxx=fx(ff)*ones(1,ncp*nrp);
        fyy=fy(ff)*ones(1,ncp*nrp);
        fzz=fz(ff)*ones(1,ncp*nrp);
        rsf=radial_dist(fxx,fyy,fzz,exx,eyy,ezz);      %end cap in +z direction
        csb=(fzz-ezz)./rsf;
        mon=-exp(j*kay*rsf).*a2./(4*pi*rsf);
        pfp(ff)=pfp(ff)+sum(mon.*(-csb.*(-1../rsf+j*kay).*pts_posz + ptd_posz));

        rsf=radial_dist(fxx,fyy,fzz,exx,eyy,-ezz);      %end cap in -z direction
        c3b=(-fzz-ezz)./rsf;
        mon=-exp(j*kay*rsf).*a2./(4*pi*rsf);
        pfp(ff)=pfp(ff)+sum(mon.*(-csb.*(-1../rsf+j*kay).*pts_negz + ptd_negz));
    end
end
```

What is claimed is:

1. A system for reducing a structure's far field acoustic radiation signature, comprising:

means for measuring near field acoustic radiation of the structure;

means for generating a prediction of the structure's far field acoustic radiation signature using said near field acoustic radiation;

means for generating at least one noise control signal to using said prediction; and acoustic radiator means mounted within said structure for converting substantially all of said at least one noise control signal to airborne acoustic energy within the structure, wherein said airborne acoustic energy reduces the structure's far field acoustic radiation signature.

2. A system as in claim 1 wherein said acoustic radiator means comprises a plurality of acoustic loudspeakers.

3. A system as in claim 1 wherein said means for generating said at least one noise control signal comprises a phase shifter for generating a phase shifted version of said prediction as said at least one noise control signal.

4. A system as in claim 3 wherein said phase shifted version is 180° out-of-phase with said prediction.

5. A system for reducing a structure's far field acoustic radiation signature, comprising:

a plurality of acoustic sensors positioned in the acoustic near field of the structure for measuring the near field acoustic radiation of the structure;

a programmable microprocessor connected to said plurality of sensors for generating a prediction of the structure's far field acoustic radiation signature using said near field acoustic radiation, and for generating at least one noise control signal using said prediction; and a plurality of acoustic radiators suspended within the structure and connected to said programmable microprocessor for converting substantially all of said at least one noise control signal to airborne acoustic energy within the structure, wherein said airborne acoustic energy reduces the structure's far field acoustic radiation signature.

6. A system as in claim 5 wherein each of said plurality of sensors is located at a fixed position within the acoustic near field of the structure.

7. A system as in claim 5 wherein said programmable microprocessor comprises a first microprocessor for generating said prediction and a second microprocessor for generating said at least one noise control signal.

8. A system as in claim 7 wherein said second microprocessor comprises a phase shifter for generating a phase shifted version of said prediction as said at least one noise control signal.

9. A system as in claim 8 wherein said phase shifted version is 180° out-of-phase with said prediction.

10. A method for reducing a structure's far field acoustic radiation signature, comprising the steps of:

measuring near field acoustic radiation of the structure with a plurality of acoustic sensors;

generating, with a programmable controller, a prediction of the structure's far field acoustic radiation signature using said near field acoustic radiation of the structure, and at least one noise control signal using said prediction; and converting, with a plurality of acoustic radiators, substantially all of said at least one noise control signal to airborne acoustic energy within the structure, wherein said airborne acoustic energy reduces the structure's far field acoustic radiation signature.

11. A method according to claim 10 wherein said at least one noise control signal is a phase shifted version of said prediction.

12. A method according to claim 11 wherein said phase shifted version is 180° out-of-phase with said prediction.

* * * * *